April 19, 1966  C. H. WILLSEY  3,246,780
FEEDING AND DELIVERY APPARATUS FOR EGG WASHING MACHINE
Original Filed May 7, 1962  6 Sheets-Sheet 1

INVENTOR
CHARLES H. WILLSEY
by Greist Lockwood Greenawalt Davey
ATTYS.

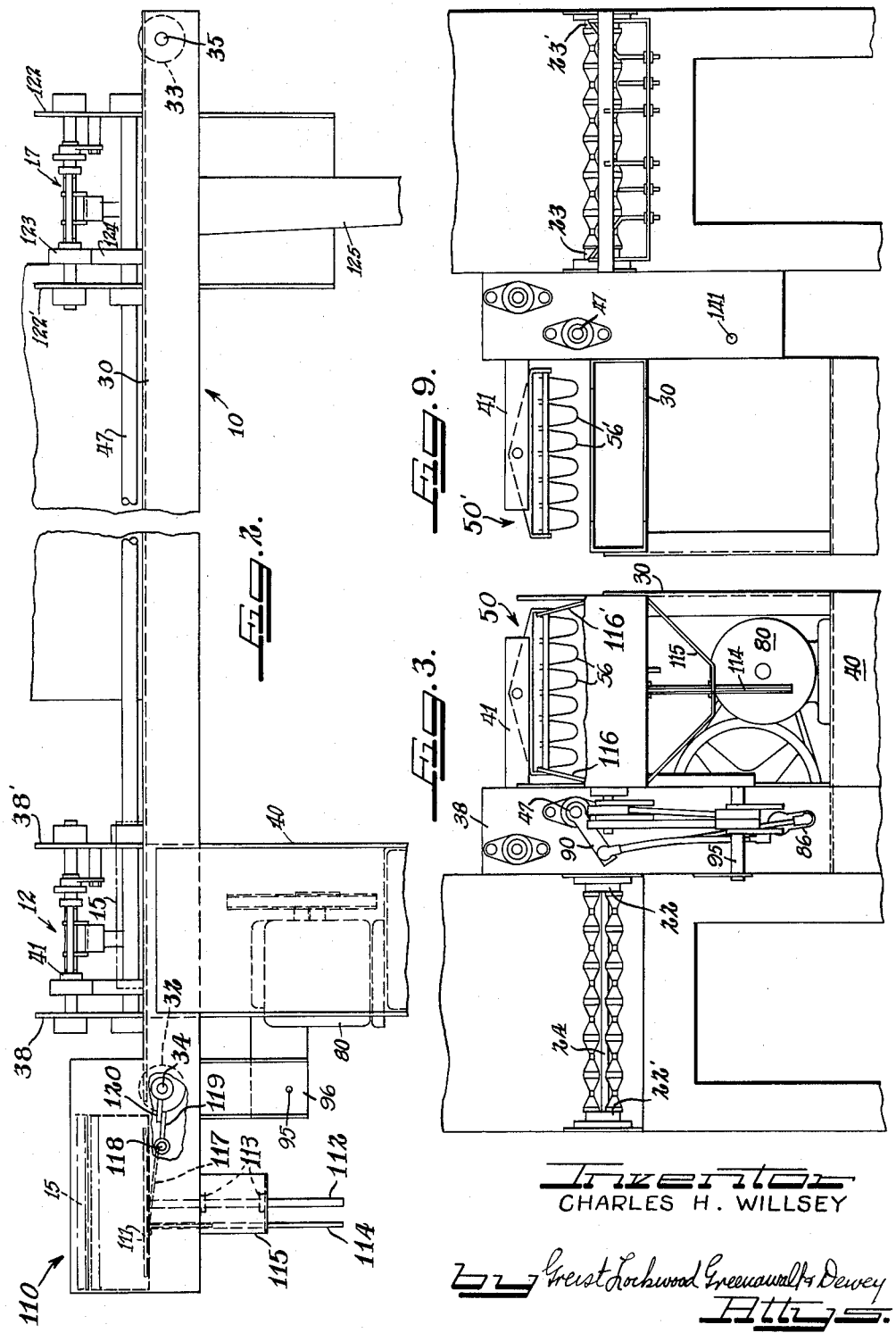

April 19, 1966 C. H. WILLSEY 3,246,780
FEEDING AND DELIVERY APPARATUS FOR EGG WASHING MACHINE
Original Filed May 7, 1962 6 Sheets-Sheet 3

INVENTOR
CHARLES H. WILLSEY
by Greist Lockwood Greenawalt & Dewey
Attys.

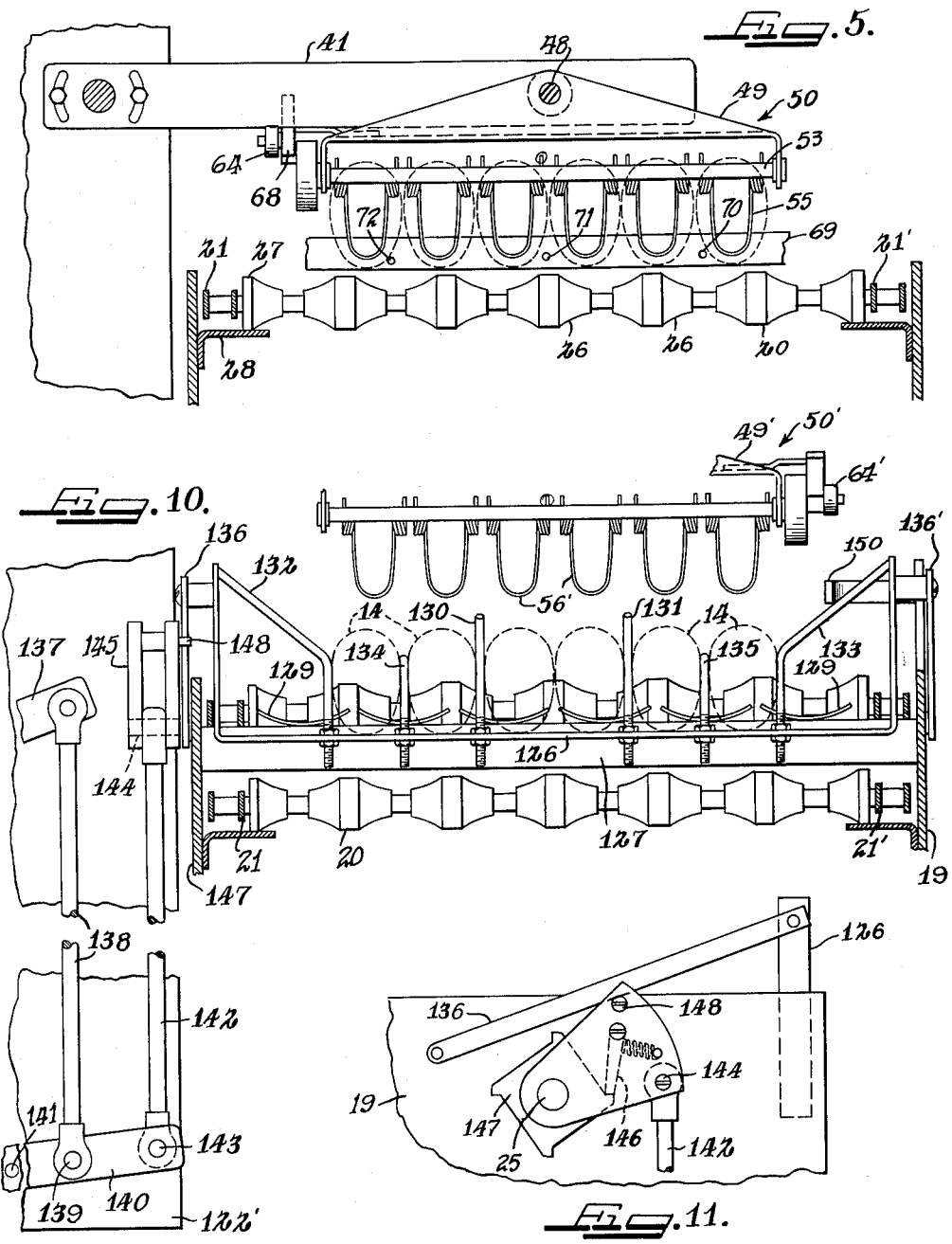

April 19, 1966 C. H. WILLSEY 3,246,780
FEEDING AND DELIVERY APPARATUS FOR EGG WASHING MACHINE
Original Filed May 7, 1962 6 Sheets-Sheet 5

INVENTOR
CHARLES H. WILLSEY
BY Gneist Lockwood Greenawalt & Dewey
ATTYS.

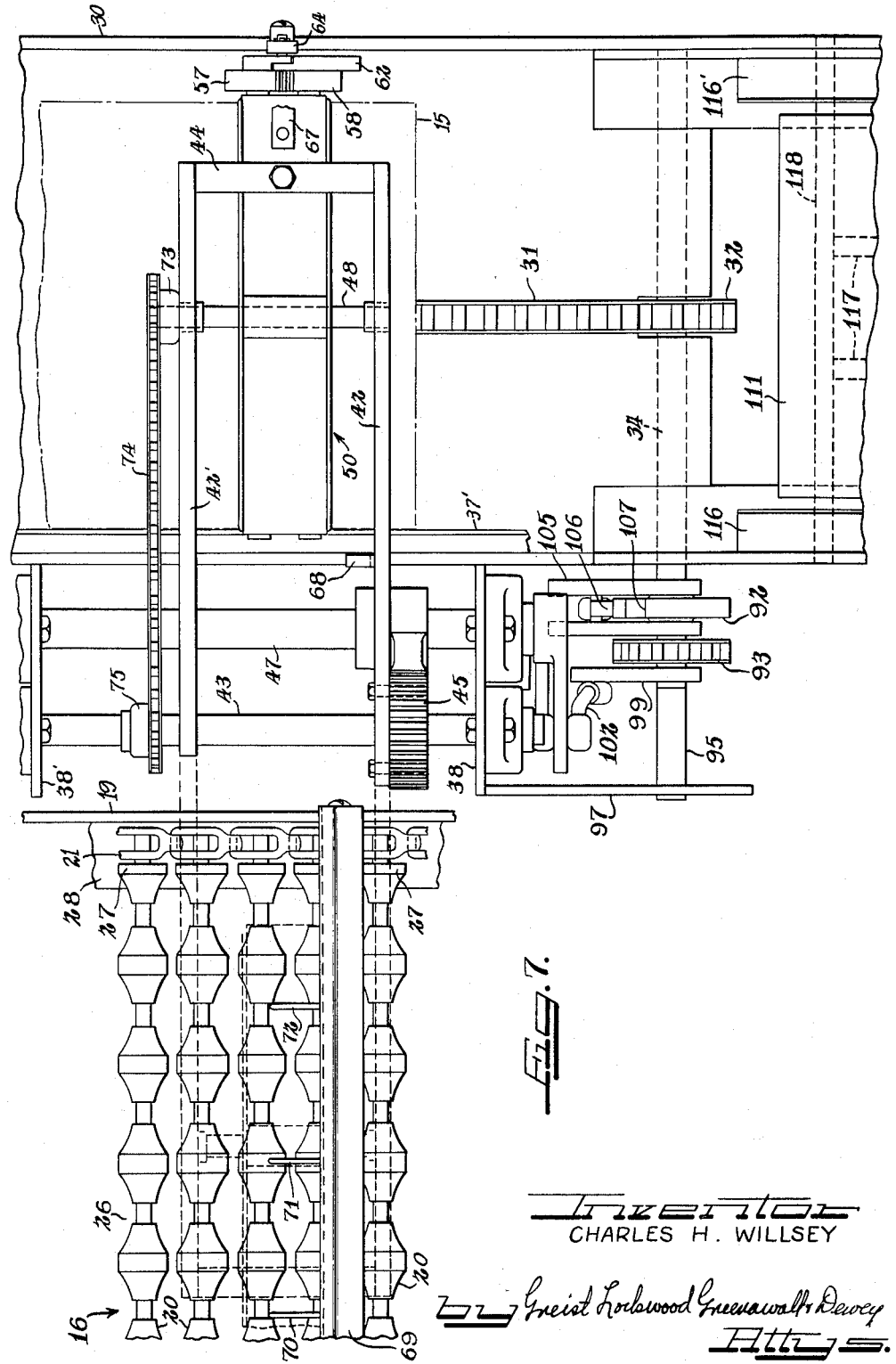

United States Patent Office 3,246,780
Patented Apr. 19, 1966

3,246,780
FEEDING AND DELIVERY APPARATUS FOR
EGG WASHING MACHINE
Charles H. Willsey, Topeka, Kans., assignor to Norris
 Grain Company, Chicago, Ill., a corporation of Illinois
Original application May 7, 1962, Ser. No. 192,807.
 Divided and this application June 28, 1965, Ser. No.
 467,433
13 Claims. (Cl. 214—309)

This application is a division of my application Serial No. 192,807, filed May 7, 1962.

This invention relates to egg handling machinery and is more particularly concerned with improvements in an egg transfer and conveyor apparatus especially adapted for use with a machine for washing or otherwise treating shell eggs preliminary to breaking and separating, or grading and/or packaging operations.

In the handling of shell eggs preparatory to cracking and separating or grading and/or packaging for retail sale, it is the usual practice to first remove the accumulation of dirt which is commonly found on egg shell surfaces and also any accompanying bacteria or germs which may be present by subjecting the eggs to a washing and sterilizing operation. Machines for automatically performing this operation have been developed wherein the eggs are carried on a continuously traveling, horizontal conveyor beneath vertically reciprocating brushes which are supplied with a cleaning fluid and wherein the conveyor comprises spaced rollers extending between side chains and having pocket forming grooves so that a plurality of eggs, for example, six in number, are carried in the pockets between successive rollers and the rollers are rotated so that the eggs are revolved continuously about their long axes while they are advanced beneath the cleaning brushes. One such machine is disclosed in my patent, No. 2,979,746, dated April 18, 1961. In operating egg washing machines of this type the eggs have been supplied generally from conventional thirty dozen packing and shipping crates, which are almost universally used in the bulk shipment and storage of shell eggs. The operator employs a lifter which is manipulated to pick up a layer of five rows of six eggs each from the packing or separator trays in the crate and to deposit the eggs on the receiving end of the washing machine conveyor. At the completion of the washing operation the cleaned eggs are delivered to a cracking machine, or discharged onto the traveling belt of a brading machine or other conveying apparatus for advance to the next processing operation or for manual return to the bulk packing case for storage or shipment. These manual feeding and delivery arrangements have not been satisfactory for many obvious reasons and it is a general object of the present invention to provide an improved infeed and outfeed apparatus which automatically transfers successive rows of eggs from loaded separator trays to the washing machine conveyor at the infeed end of the washing machine and at the outfeed end thereof transfers the clean eggs to empty pockets in another separator tray so that the only task required of the operator is the removal of the loaded separator trays from the packing case and the return of the same when filled with clean eggs.

It is a more specific object of the invention to provide apparatus for automatically transferring eggs in row formation from a loaded or partially loaded separator tray carried on a side conveyor to the infeed end of an egg washing machine conveyor and at the end of the washing cycle for transferring the cleaned eggs in row formation from the washing machine conveyor to an empty row of pockets in a separator tray which may also be carried on the side conveyor.

It is a still more specific object of the invention to provide an apparatus for automatically feeding eggs from a loaded packing or separator tray to the receiving end of an egg washing machine conveyor and for automatically removing the cleaned eggs at the discharge end of the washing machine conveyor and depositing them in an empty separator tray which apparatus comprises a tray supporting conveyor arranged in parallel relation along a side of the washing machine conveyor with a tray stacking mechanism for receiving empty trays at the leading end thereof, a swinging transfer frame which is operative at the infeed end of the washing machine conveyor to intermittently pick up a row of eggs from a loaded tray on the parallel conveyor and deposit the same on the washing machine conveyor, a like transfer frame at the outfeed end of the washing machine conveyor which is operative intermittently to pick up each successive row of cleaned eggs from the washing machine conveyor and deposit the same in a row of empty pockets in a separator tray on the parallel conveyor, and mechanism for intermittently advancing the conveyors and for swinging the transfer frames in timed relation to the movement of the conveyors whereby all that is required to keep the washing machine operating with a continuous supply of eggs is the placing of separator trays filled with eggs adjacent one end of the parallel conveyor, the placing of empty separator trays adjacent the other end of the same conveyor and the removal of the trays when they are filled with clean eggs by operation of the transfer frame at the outfeed end of the washing machine.

Another object of the invention is to provide in apparatus of the type described a tray stacking device at the leading end of the tray supporting conveyor which is operative automatically to receive the separator trays after the eggs are removed therefrom and to arrange successive trays in a stack.

Still another object of the invention is to provide in an egg handling apparatus of the type described an egg orienting or arranging device which receives successive rows of eggs from a revolving roller type conveyor, where they are arranged with their long axes extending generally horizontal, and elevates the eggs while automatically arranging the eggs with their axes generally vertical and with their larger ends uppermost so as to facilitate removal of the rows of eggs from the conveyor by an associated transfer mechanism which includes an oscillating frame having pairs of co-operating egg gripper members and power drive means for swinging the frame into and out of an egg pick up position where the gripper members are closed on a row of eggs on the orienting device.

These and other objects and advantages of the invention will be apparent from a consideration of the apparatus which is shown by way of illustration in the accompanying drawings wherein:

FIGURE 2 is a side elevation of the egg handling apparatus with portions thereof broken away;

FIGURE 3 is an end elevation of the apparatus at the infeed end of the washing machine;

FIGURE 5 is a fragmentary section taken on the line 5—5 of FIGURE 1, to an enlarged scale, and with the transfer device in position to discharge a row of eggs onto the washing conveyor;

FIGURE 7 is a fragmentary plan view at the infeed end of the washing machine, to an enlarged scale;

FIGURE 9 is a section taken on the line 9—9 of FIGURE 1;

FIGURE 10 is a section taken on the line 10—10 of FIGURE 1, to an enlarged scale; and FIGURE 11 is a section taken on the line 11—11 of FIGURE 1, to an enlarged scale.

Figure 1:
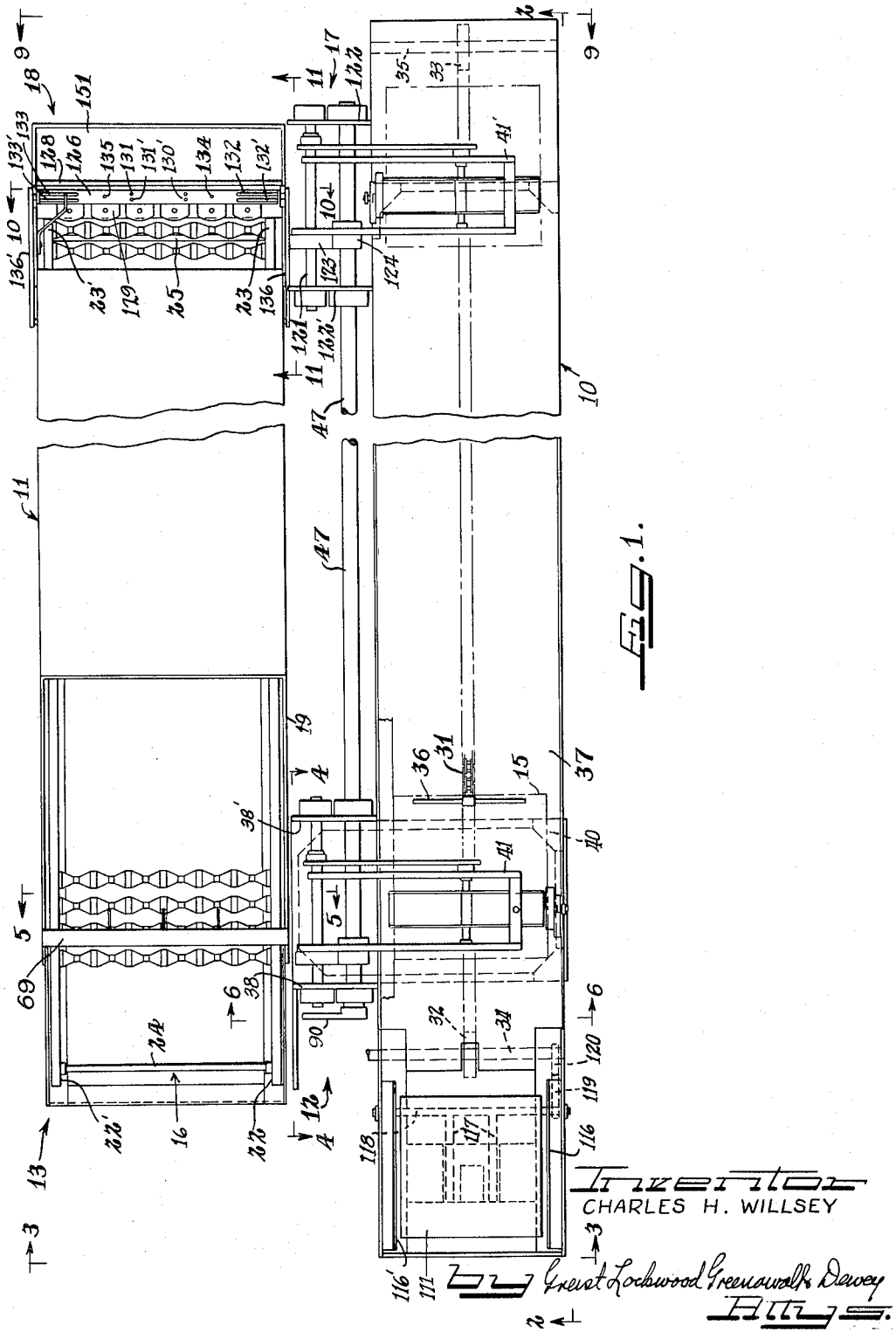
FIGURE 1 is a plan view of an egg handling apparatus arranged for delivering eggs to the infeed end of an egg washing machine and removing the clean eggs from the outfeed end of the washing machine, with parts of the washing machine being omitted and with portions of the handling apparatus being broken away.
Figure 4:
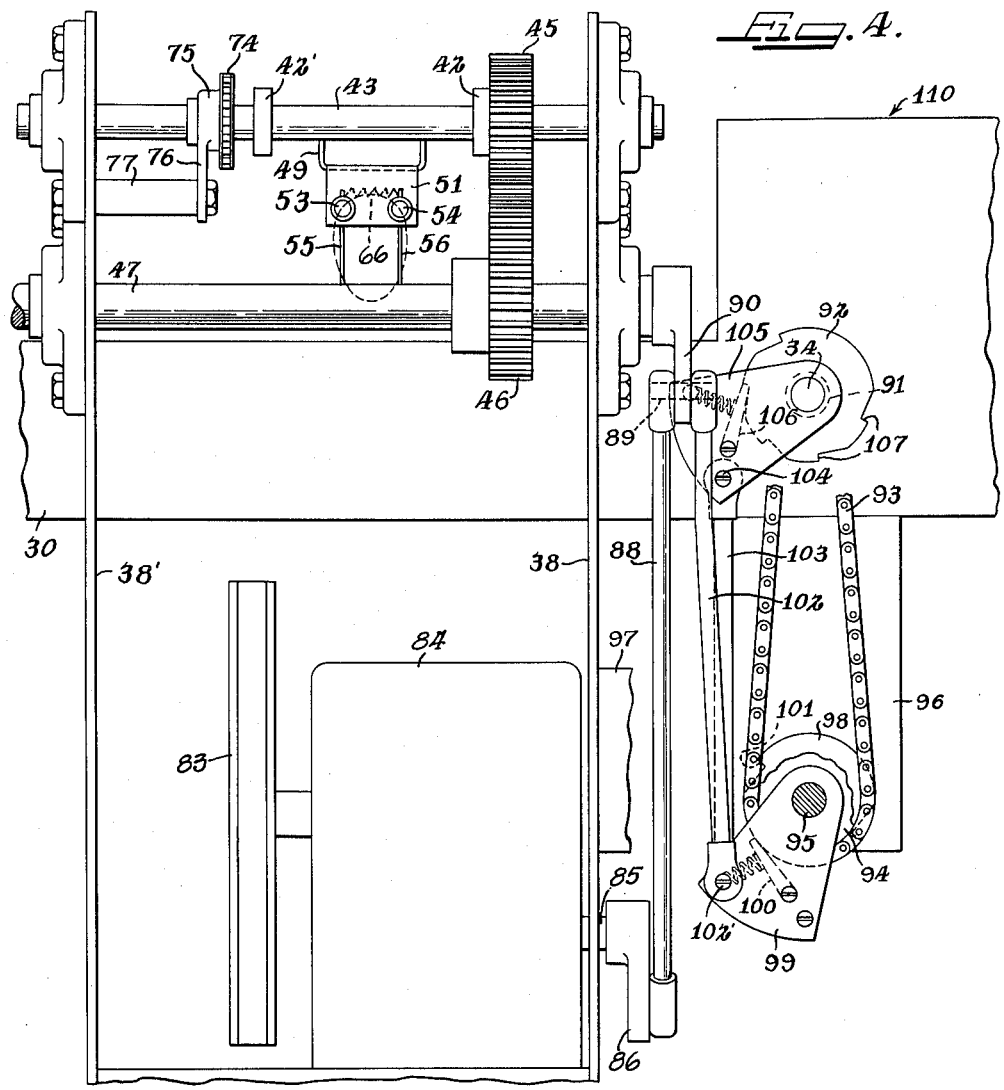
FIGURE 4 is a sectional view taken on the line 4—4 of FIGURE 1, to an enlarged scale.

Referring first to FIGURES 1, 2, 3 and 9, there is illustrated a conveyor assembly 10 arranged in parallel relation alongside of an egg washing machine 11 with a transfer device 12 at the infeed end 13 of the washing machine 11 which is operative to remove successive rows of eggs 14 from egg supporting separator trays 15 which are placed on the conveyor assembly 10 and deposit them on a roller-type conveyor assembly 16, which constitutes the egg supporting and transporting means for the washing machine 11, and with a second transfer device 17 at the discharge end 18 of the washing machine 11 which is operative to remove successive rows of clean eggs from the washing machine conveyor assembly 16 and deposit them in the pockets of empty separator trays which are also placed on the conveyor assembly 10.

The washing machine 11 is supported on an upright rectangular frame 19 and includes a horizontally disposed, egg supporting and transporting conveyor assembly 16 and associated mechanism (not shown) for cleaning, sterilizing and drying the surfaces of the egg shells as they are transported through the machine from the infeed end 13 to the outfeed or discharge end 18 thereof. An egg washing machine of the type with which the present apparatus is adapted to be associated is disclosed in my patent, No. 2,979,746, and reference may be had thereto for details of the washing apparatus which are not hereinafter described and which are not part of the present invention.

The washing machine conveyor assembly 16 (FIGURES 1, 5 and 7) comprises a series of longitudinally spaced, parallel roller assemblies 20 which extend between a pair of side chains 21 and 21' carried at opposite ends of the washing machine frame 19 on pairs of supporting sprockets 22, 22' and 23, 23' secured on longitudinally spaced, parallel cross shafts 24 and 25 journaled in the side members of the support frame 19. The roller assemblies 20 are provided with axially spaced grooves 26 which provide egg receiving pockets between each roller assembly 20 and the adjacent roller assembly. The illustrated apparatus is designed to accommodate a row of six eggs between each pair of roller assemblies 20. The roller assemblies are rotatably connected to the chains 21 and 21' and portions 27 at opposite ends engage with fixed tracks 28 on the frame 19 so that as the roller assemblies 20 advance they are rotated about their axes and the eggs carried in the pockets are rotated about their long axis.

The conveyor assembly 10 which receives the egg supporting separator or packing trays or flats 15 is mounted on an upright rectangular frame 30 arranged in longitudinally extending, parallel relation along one side of the frame 19 of the washing machine 11 and spaced a short distance therefrom. An endless chain 31 is supported on the frame 30 on end sprockets 32 and 33 carried on parallel, longitudinally spaced cross shafts 34 and 35. The chain 31 is provided with longitudinally spaced cross bars 36 which constitute pushers for advancing the eggs trays or flats 15 along a supporting top plate 37 on the conveyor assembly 10 and the upstanding leg of an angle guide bar 37'. The cross shaft 34 at the one end of the conveyor assembly 10 is driven by mechanism which will be described so as to intermittently advance filled trays 15 placed thereon a distance sufficient to bring successive rows of eggs into proper position for removal of the eggs by the transfer device 12.

The egg trays 15 which are adapted to be placed on the conveyor assembly 10 are of molded pulp or plastic construction and of a type commonly used as separators in standard 30 dozen egg crates. They are provided with an assembly of egg receiving pockets which accommodate in fully loaded condition five rows of six eggs each, with the eggs being positioned in the pockets in the customary fashion, that is, with the large ends uppermost.

The egg transfer device 12 which is provided at the infeed end 13 of the washing machine 11 for transferring each successive row of eggs from the trays 15 on the conveyor assembly 10 to pockets between a pair of roller assemblies 20 on the washing machine conveyor 16 is mounted on a pair of longitudinally spaced support plates 38 and 38' upstanding from a base or end frame 40 which constitutes the end support for the conveyor frame 30. The support plates 38 and 38' are disposed in parallel, transverse planes and project above the conveyor support frame 30 between the frame 30 and the washing machine support frame 19. A rectangular transfer frame 41 is mounted on the support plates 38 and 38' which comprises side bars or plates 42 and 42' which are secured at one end to a shaft 43, the latter having its ends journaled in the support plates 38 and 38'. The side bars 42 and 42' are connected by a cross bar 44 at their free ends. The frame supporting shaft carries a pinion 45 adjacent one end which is in toothed engagement with a segment 46. The segment 46 is mounted on the rock shaft 47 which is journaled in suitable bearings in the vertical support plates 38 and 38' and extends substantially the full length of the washing machine and parallel with conveyors 10 and 16. The shaft 47 is adapted to be oscillated so as to move the frame 41 through an arc of approximately 180°. A shaft 48 is journaled in the side members 42, 42' at the other end of the frame 41 and carries a base forming member 49 of an egg gripper assembly 50.

Figure 8:
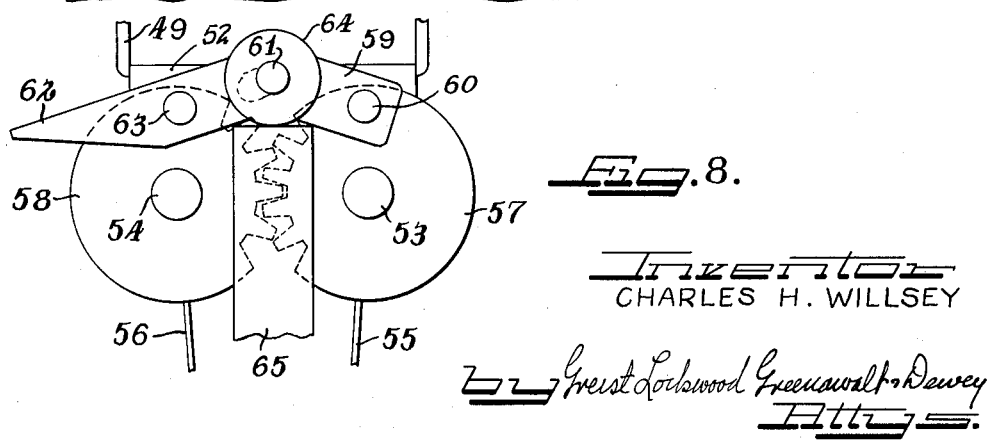
FIGURE 8 is a view on the line 8—8 of FIGURE 6, to an enlarged scale.
Figure 6:
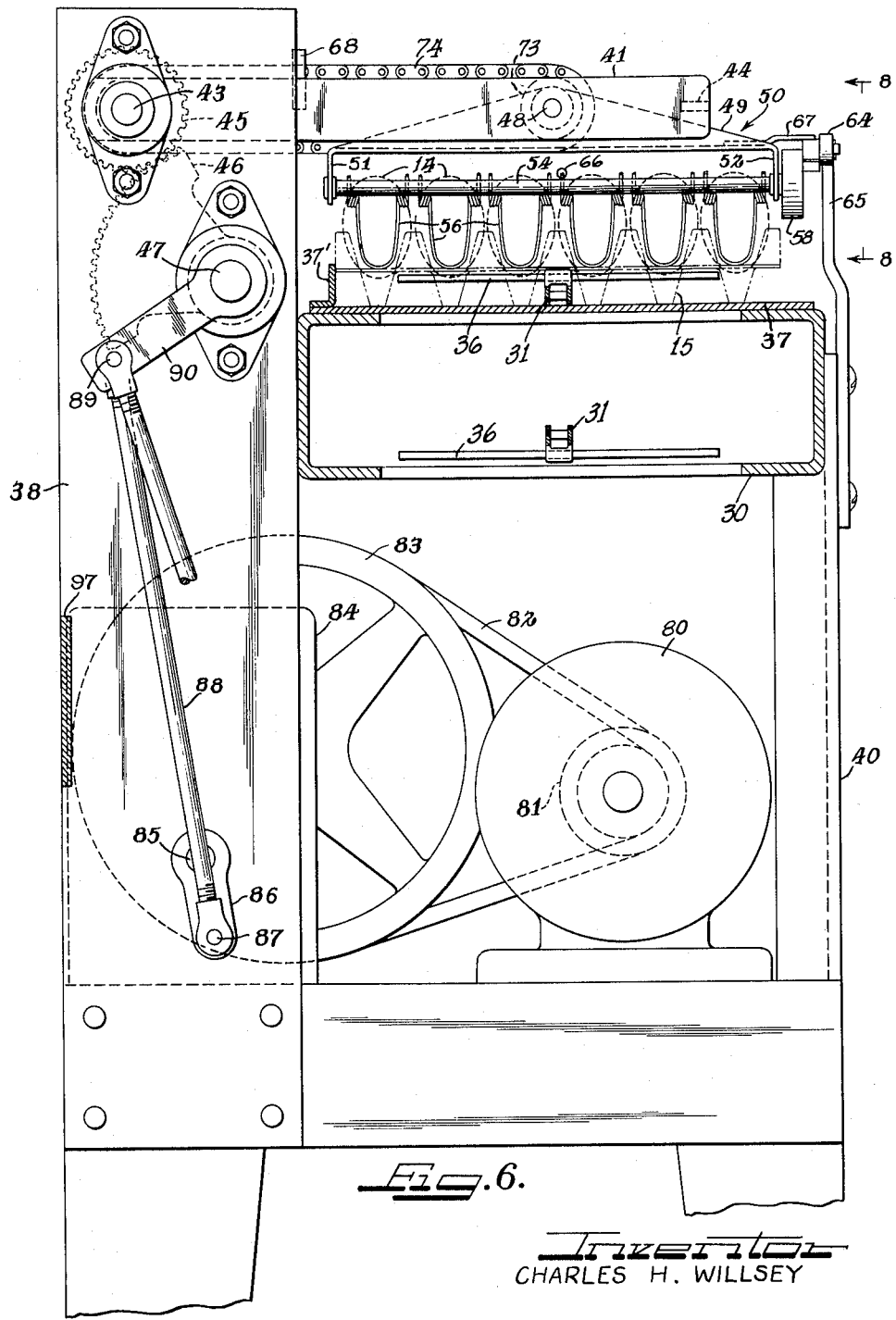
FIGURE 6 is a section taken on the line 6—6 of FIGURE 1, to an enlarged scale.

The egg gripper assembly 50 (FIGURES 4, 6, 7 and 8) includes the base forming member 49 which is formed with end plates 51 and 52 in which are journaled two parallel bar or rod members 53 and 54 on which six pairs of egg gripper forming wire loops 55 and 56 are secured. The wire loops 55 and 56 which form co-operating egg gripping members are of spring wire bent into U-shape with coiled sections at the ends of the legs and the terminals of the latter secured in sockets provided in the supporting rods 53 and 54 as shown in FIGURE 6. At one end the rods 53 and 54 extend through the end plate 52 of the support member 49 and carry a pair of interengaging segments 57 and 58 so that the rods rotate or turn about their axes in unison and in opposite directions. The two segments 57 and 58 are connected by an operating linkage (FIGURE 8) which consists of a short link 59 mounted on a pin 60 on the one segment 57 and connected by pivot 61 with the end of an opening arm or lever 62, the latter being in turn mounted on a pivot 63 on the other segment 58. A cam operated closing roller 64 is mounted on the outer end of the pivot 61 and the linkage formed by the two members 59 and 62 is arranged so that the pivot 61 may be moved across dead center in rotating the gripper carrying rods 53 and 54. In the position shown in FIGURE 8 the opening arm 62 has been pivoted to bring the egg gripping members 55 and 56 into closed egg gripping position by engagement of the closing roller 64 with an upstanding cam bar 65 on the conveyor assembly frame 30 which moves the pin 61 past dead center and rotates the rods 53 and 54 to close the gripper members 55 and 56 on a row of eggs in a tray 15 on the conveyor. A tension spring 66 is connected between the two rods 53 and 54 so as to hold the gripper members 55 and 56 in either the open or closed position depending upon the location of the pin 61. A stop plate 67 on the member 49 limits the movement of the roller 64 in the direction to close the egg gripper members.

Each row of eggs is transferred by swinging movement of the frame 41 carrying the gripper assembly 50 from the tray 15 which is advanced by the chain 31 on the conveyor 10 along the guide bar 37' to a position above the conveyor assembly 16 for deposit in pockets between a pair of roller assemblies 20. A cam bar 68 is mounted on the frame 41 for tripping the arm 62 to open the gripper members 55 and 56 so as to release the eggs for deposit in the conveyor pockets. A cross bar member 69 (FIGURES 1, 5 and 7) is mounted on the frame 19 at the infeed end of the washing machine above the conveyor 16 and in the path of the eggs carried by the gripper members 55 and 56. The cross bar 69 has mounted thereon horizontally extending pins 70, 71 and 72 which are spaced transversely of the conveyor 16 so as to guide the eggs into the pockets in predetermined arrangement, that is, three of the eggs in the row are tilted on the one side of the center of the conveyor so that they settle into the pockets with their larger ends pointing in the direction towards the side of the conveyor while the three eggs on the other side of the center of the conveyor are guided into the conveyor pockets with the larger ends pointing in the opposite direction. The gripper assembly 50 is maintained in horizontal position during the movement of the frame 41 by connecting the sprocket 73 mounted on the end of the cross shaft 48 through chain 74 with sprocket 75 which is rotatably supported on the shaft 43 and held in fixed position by connecting the arm 76 extending from the sprocket 75 to support plate 38' with a bracket or bolt member 77.

The rock shaft 47 and the conveyor assembly 10 are connected to a common drive mechanism. The rock shaft 47 is oscillated and the conveyor drive shaft 34 is rotated intermittently in timed relation through a link and ratchet mechanism which is operated by motor 80 mounted on the infeed supporting frame member 40 (FIGURES 1 and 6) at the end of the washing machine. The motor 80 (FIGURE 6) has its drive pulley 81 connected by a belt 82 with a pulley 83 on a change speed derive 84. The output shaft 85 of the change speed device carries a crank arm 86 which is pivotally connected at 87 to the bottom end of an upwardly directed link bar 88. The link bar 88 has its upper end pivoted at 89 to a crank arm 90 mounted on the rock shaft 47. Rotation of the crank arm 90, of course, oscillates the rock shaft 47.

The drive shaft 34 of the conveyor assembly 10 is extended beyond the side of the conveyor support frame 30 and carries a sprocket 91 and a ratchet member 92. The sprocket 91 is connected by the chain 93 with a sprocket 94 mounted on a shaft 95 which is journaled in laterally spaced bearing forming bracket plates 96 and 97, the former depending from the side of the conveyor frame 30 and the latter extending from the support plate 38. The lower shaft 95 carries a ratchet 98 which is straddled by a U-shaped member 99 pivotally mounted on the shaft 95 and carrying a spring pressed dog 100 for engaging with the two teeth 101 on the ratchet member 98. The dog carrying member 99 has the lower end of link 102 pivoted thereto at 102' with the upper end of the link 102 connected to the pivot 89 on the crank arm 90 so that reciprocation or oscillation of the crank arm 90 oscillates the dog carrying member 99. A link member 103 has its lower end connected to the pivot 102' on the member 99 and its upper end pivotally connected at 104 to another U-shaped dog carrying member 105 which is rotatably supported on the conveyor drive shaft 34. The member 105 has a spring pressed dog 106 which engages with the teeth 107 on the ratchet member 92. The ratchet 92 is provided with five of the teeth 107 for engagement by the dog 106, so that oscillation of the member 105 through the connecting linkage 102, 103 with the crank arm 90 and engagement of the dog 106 with each tooth 107 on the ratchet 92 turns the shaft 34 so as to move the tray advancing conveyor chain 31 a distance corresponding to the distance between the centers of adjoining rows of eggs on a tray 15 which is advanced by a cross bar 36. Rotation of the shaft 34 through the turning of the ratchet member 93 causes the lower shaft 95 to be rotated one-half the amount due to a two-to-one ratio of the sprockets 91 and 94. The ratchet member 99 on the lower shaft 95 is provided with two teeth 101 which are 180° apart and which are adapted to be engaged by the dog 100 on the oscillating member 99. The ratchet members 92 and 94 are arranged on the shafts 34 and 95 so that a tooth 101 on the ratchet member 94 is engaged by the dog 100 on the oscillating member 99 after the fifth tooth 107 on the ratchet member 92 has been engaged by the dog 106 and the conveyor chain 31 has been advanced to position the fifth row of eggs on a tray 15 for pick up by the transfer device 12. Engagement of the dog 100 with a tooth 101 causes the shaft 95 to rotate and through the chain and sprocket connection the shaft 34 is also rotated overriding the ratchet member 92. This advances the conveyor chain 31 the necessary distance to bring the first row of eggs in a succeeding tray 15 into pick-up position with the empty tray 15 ahead of the same being advanced to a stacking mechanism 110 at the end of the chain 31. It also rotates the ratchet 92 so as to position the first tooth 107 for engagement by the dog 106 upon the next swinging of the member 105.

The empty tray stacking mechanism 110 comprises a lifting plate or platform 111 mounted on a depending vertical rod or post 112 which is supported for vertical reciprocation in guide forming bearing members 113. The lift plate 111 also has a depending guide rod 114 mounted in parallel relation with the rod 112 which slides in a guideway forming member 115 to prevent turning of the lift plate 111 about the axis of the support rod 112. The lift plate 111 is mounted to reciprocate between a pair of laterally spaced, upwardly extending, stack supporting spring plates 116 and 116' which have their upper edges spaced apart a distance somewhat less than the width of a tray 15 so that when a tray 15 is deposited on the lift plate 111 by the conveyor chain 31 it may be lifted by the plate 111 into position on the bottom of the stack with the plates 116 and 116' springing apart sufficiently to permit the tray to move into position above the same, leaving the stack resting on the top edges of the plates 116 and 116' when the lift plate 111 is lowered. The lift plate 111 is reciprocated in a vertical direction in timed relation to the movement of the conveyor chain 31 by a pair of arm members 117 which are mounted on a cross shaft 118 journaled in the side plates of the conveyor support frame 30 and carrying on one end an arm 119 which extends into the path of an arm 120 carried on the end of the conveyor drive shaft 34 so that when the shaft 34 is rotated to advance a tray 15 onto the lift plate 111 the arm 120 engages with the arm 119 causing rotation of the shaft 118 and raising the lift plate 111 so as to elevate the empty tray 15 into the bottom of the stack.

At the outfeed end 18 of the washing machine (FIGURES 1 and 9) the rows of eggs are removed from the conveyor 16 by a transfer device 17 which is of the same construction as the transfer device 12 at the infeed end of the machine. The outfeed transfer device 17 is operated to pick up successive rows of eggs from the outfeed end 18 of the washing machine conveyor 16 and transfer the same to empty pockets in an egg packing tray 15' which is carried on the trap supporting conveyor assembly 10. The empty trays 15' may be manually placed on the conveyor 10 by the operator or they may be automatically fed from a magazine (not shown) associated with the conveyor 10. Any suitable mechanism for unstacking and feeding empty trays for pick up by the cross bars 36 may be employed.

The outfeed transfer device 17 (FIGURES 1 and 9 to 11) comprises a supporting frame 41' which corresponds to the frame 41 of the transfer device 12 and a gripper assembly 50' which corresponds to the gripper assembly of the transfer device 12 but which is mounted with its ends reversed on the frame 41'. The frame 41' is mounted on a shaft 121 which is journaled in longitudinally spaced, vertical support plates 122 and 122' and carries a pinion 123 engaging with a toothed segment 124 on the rock shaft 47 which is also journaled in the support plates 122 and 122'. The support plates 122 and 122' are carried above an end frame support or base frame 125 for the conveyor assembly 10.

Each successive row of eggs is delivered at the outfeed end 18 of the washing conveyor 13 for pick up by the gripper members 55' and 56' on the transfer device 17 by means of a reciprocating U-shaped bar or frame 126 which reciprocates in a vertical path between a pair of spaced cross bar members 127 and 128 mounted at the end of the washing machine frame 19 on which each successive row of eggs is delivered from the pockets in the conveyor 16. The cross bar member 127 which is adjacent the end of the conveyor 16 is provided with spaced guide forming pad members 129 for supporting the eggs as they roll out of the pockets between the roller assemblies and onto the bars 127 and 128. The reciprocating egg positioning frame 126 is provided with an arrangement of upstanding wire-like rod members or pins which are spaced in symmetrical relation on opposite sides of the longitudinal center line of the conveyor and which are constructed and arranged to position the eggs uniformly with the larger ends up and properly spaced to be picked up by the gripper members 55' and 56'. The innermost orienting rods 130, 130' and 131, 131' are arranged in paired relation with the upper ends of each pair thereof bent slightly outwardly and with the pairs of rods equally spaced from the longitudinal center line of the conveyor 16. The rods of each pair thereof are spaced in the direction longitudinally of the machine. The outermost orienting rods 132, 132' and 133, 133' arranged in pairs in a like manner and the pairs thereof are equally spaced from the longitudinal center line of the machine with their upper portions angled upwardly and outwardly so as to cause the end eggs in the row to turn on their small ends into the pockets formed between the outermost pairs of rods and the next adjacent single rods 134 and 135 which are equally spaced between the outermost and innermost pairs of rods. With the rods arranged as shown particularly in FIGURE 10, the eggs are picked up by upward movement of the frame member 126 so that they assume a position with their long axes vertical and with their centers spaced across the frame with the same spacing as the spacing of the gripper members 55', 56' on the gripper assembly 50'. The orienting frame 126 is pivotally connected at opposite ends to the ends of a pair of supporting arm members 136 and 136' which have their opposite ends pivoted to the side members of the washing machine frame 19. The egg orienting and lifting frame 126 is reciprocated between the bar members 127 and 128 in timed relation to the movement of the conveyor 16 and the transfer device 17 by mechanism connected to the rock shaft 47. A crank arm 137 is mounted on the rock shaft 47 and pivotally connected to the upper end of a vertically extending link 138 which is pivotally connected at its lower end at 139 to a short crank arm 140 which is supported on a pivot shaft 141 extending between the support plates 122 and 122'. A second vertically extending link 142 has its lower end pivotally connected at 143 to the crank arm 140 and its upper end pivoted at 144 to one corner of a triangular plate member 145 which is pivotally mounted on the end of the shaft 25 which drives the washing machine conveyor 16. The plate member 145 carries a spring pressed dog 146 which operates a ratchet plate 147 secured on the conveyor drive shaft 25 for advancing the washing machine conveyor 16 intermittently in timed relation to the oscillation of the drive shaft 47 and the swinging movement of the transfer device 17. The plate member 45 is also provided with a pin 148 on which the supporting arm member 136 for the orienting frame 126 rests so that reciprocation of the link 142 raises and lowers the orienting frame 126 in timed relation to the movement of the transfer device 17 and the washing machine conveyor 16. A cam forming member 150 mounted on the washing machine conveyor frame 19 is disposed in the path of the roller 64' for closing the gripper members 55' and 56' when the assembly 50' reaches the pick up position. A waste tray 151 extends outwardly of the outermost cross bar 128 at the end of conveyor 16.

In the operation of the apparatus the operator removes trays 15 filled with the eggs from a standard egg crate and places them on the conveyor assembly 10 in position for pick up by the cross bars 36 at the left hand end of the conveyor as shown in FIGURE 1. The conveyor is intermittently advanced by operation of the drive mechanism to advance successive rows of eggs into proper position for pick up by the infeed transfer device 12 which automatically picks up each row of the eggs and deposits the eggs in the pockets of the conveyor 16 on which the eggs are advanced through the washing machine 11 to the discharge end 18 thereof where each successive row of eggs is discharged onto the parallel bars 127 and 128. When a tray is emptied by operation of the transfer device 12 it is moved ahead of the transfer station and into the tray stacking mechanism. The orienting and lifting frame 126 is moved vertically in timed relation to the delivery of the eggs onto the supporting bar members and to the movement of the outfeed transfer device 17. The eggs are turned on end, with the larger end uppermost, by upward movement of the frame 126 and raised to the proper elevation for pick up by the gripper fingers 55' and 56' on the outfeed transfer device 17. Each successive row of eggs is picked up and moved by operation of the transfer device 17 to proper position for deposit in a row of empty pockets in a packing tray which has been positioned on the right hand end of the conveyor assembly 10 either by the attendant or by means of an automatic unstacking and feeding apparatus. When a tray at the right hand end of the machine is filled with clean eggs and is advancing towards the middle of the conveyor assembly 10, it is removed from the conveyor by the attendant and placed in a clean egg crate. Thus all that is required of the operator to keep the washing machine operating at full capacity is to supply filled egg trays at one end of the conveyor assembly 10, empty egg trays at the other end and remove the trays filled with clean eggs.

While specific details of construction and particular materials have been referred to in describing the apparatus illustrated in the drawings, it will be understood that other details of construction and equivalent materials may be resorted to within the spirit of the invention.

I claim:

1. Apparatus for feeding eggs in row formation from egg packing trays in which the eggs are arranged in row formation to a horizontally disposed, intermittently advancing egg transporting conveyor which egg transporting conveyor is characterized by spaced rollers extending between side chains and having axially spaced, circumferential grooves adapted to form egg receiving pockets between successive rollers, a supporting conveyor for the egg trays also disposed horizontally and arranged in parallel relation along one side of said egg transporting conveyor, an egg transfer device mounted adjacent the egg receiving end of the egg transporting conveyor, said transfer device comprising a frame pivotally mounted to swing in a path between and above said conveyors, a laterally disposed gripper assembly pivoted on said frame so as to swing about an axis which is parallel with the pivot axis of said frame, said gripper assembly comprising pairs of co-operating gripper members arranged in row formation, means to swing said frame between an egg pick up position above a packing tray positioned on said tray supporting conveyor and an egg discharge position above said egg transporting conveyor, means to maintain said gripper assembly in a horizontal position during its movement, means to close said pairs of grippers on a row of eggs when said gripper assembly is in the egg pick up position and to open said pairs of grippers when said gripper assembly is in the egg deposit position, and means to intermittently advance said tray supporting conveyor in timed relation to the movement of the egg transporting conveyor.

2. Apparatus as recited in claim 1, and an empty tray stacking device at the leading end of the tray supporting conveyor.

3. Apparatus as recited in claim 1, and egg guiding and spacing members positioned in the path of the eggs adjacent the egg transporting conveyor to guide the eggs in predetermined relation into the pockets on the egg transporting conveyor.

4. Apparatus as recited in claim 1, and laterally spaced, horizontally disposed rod members mounted on a supporting frame member above the egg transporting conveyor and in the path of the eggs for guiding the eggs from their closely spaced, vertically disposed position in the gripper members into horizontally disposed position as they are dropped by opening of the grippers and settle into a row of pockets on the egg transporting conveyor.

5. The combination with a horizontally disposed endless egg carrying conveyor which is characterized by spaced rollers extending between side chains and having axially spaced, aligned grooves adapted to form egg receiving pockets between successive rollers, an egg tray supporting conveyor also disposed horizontally and arranged to travel parallel with and along one side of said egg carrying conveyor, an egg transfer frame mounted adjacent the egg receiving end of the egg carrying conveyor, said transfer frame being pivoted to swing in a lateral path between and above said conveyors, a laterally disposed gripper frame pivoted on said transfer frame so as to swing about an axis which is parallel with the pivot axis of the transfer frame, a plurality of pairs of co-operating egg gripper members on said gripper frame, means to oscillate said transfer frame between an egg pick up position above an egg tray carried on said tray supporting conveyor and an egg discharge position above said egg carrying conveyor, means to maintain said gripper frame in a horizontal position, means to close said pairs of grippers on a row of eggs when said gripper frame is in the egg pick up position, and means to open said pairs of grippers when said gripper frame is in the egg discharge position.

6. The combination with a horizontally disposed intermittently advancing endless egg carrying conveyor which is characterized by spaced rollers extending between side chains and having axially spaced grooves which are aligned longitudinally of the conveyor so as to form egg receiving pockets between successive rollers, an intermittenly operated tray supporting conveyor also disposed horizontally along one side of said carrying conveyor and arranged to travel in the opposite direction, an egg transfer device mounted adjacent the egg receiving end of the egg carrying conveyor, said transfer device comprising a rectangular frame at one end on an upright support so as to swing in a lateral path between and above said conveyors on an axis parallel with said conveyors, a laterally disposed gripper assembly pivoted on the free end of said frame so as to swing about an axis which is parallel with the pivot axis of said frame, a plurality of pairs of co-operating egg gripper members pivoted on said gripper assembly, means to swing said frame between an egg pick up position above an egg tray positioned on said tray supporting conveyor and an egg discharge position above said egg carrying conveyor, means to hold said gripper assembly in a horizontal position while it is moving with said frame, means to close said pairs of grippers on a row of eggs on the egg tray when said gripper assembly is in the egg pick up position and to open said pairs of grippers so as to release the eggs when said gripper frame is in the egg discharge position.

7. In combination with an egg transporting conveyor which is characterized by a series of parallel, circumferentially grooved rollers extending between side support members and spaced to provide pockets for supporting eggs in row forming, end-to-end alignment, apparatus for removing successive rows of eggs from the discharge end of said transporting conveyor comprising a transfer frame mounted for lateral swinging movement above the transporting conveyor and having an egg pick up head with a row of co-operating egg gripping finger members mounted thereon, means to open and close the egg gripping finger members for picking up a row of eggs arranged in side-by-side relation and for releasing the rows of eggs for deposit in the pockets of a packing tray, and an egg orienting device at the discharge end of the transporting conveyor which comprises vertically extending guide members arranged to guide the eggs from their end-to-end arrangement on the conveyor into vertically disposed, side-by-side relation for pick up by the egg gripping members.

8. Apparatus for removing rows of eggs from the end of an egg transporting conveyor of the type which is characterized by a series of grooved rollers extending in parallel relation between side chains and spaced to provide pockets for supporting eggs in row forming end-to-end alignment, said apparatus comprising a transfer frame mounted for swinging movement in a lateral path above the transporting conveyor and having an egg pick up head with a row of co-operating egg gripping finger members mounted on rotatable support rods thereon, means to rotate the support rods so as to open and close the egg gripping finger members for picking up a row of eggs arranged in side-by-side and on end relation at the end of the transporting conveyor and for discharging the row of eggs into the pockets of a packing tray alongside the transporting conveyor, and an egg orienting device at the end of the transporting conveyor which comprises a transversely extending lift member and vertically extending guide members which are arranged to receive the eggs in end-to-end arrangement from the conveyor and lift the eggs into position for pick up by said head while bringing the eggs into vertically disposed, side-by-side relation.

9. Apparatus for transferring eggs in row formation from an endless traveling egg conveyor in a direction laterally of the discharge end of the conveyor to the pockets of a packing tray supported along the side of the conveyor, said conveyor comprising parallel roller assemblies extending between side chains and having circumferential grooves forming egg receiving pockets between adjacent roller assemblies in which the eggs are arranged in end-to-end relation with their long axes generally parallel with the axes of the roller assemblies, a pair of parallel, spaced cross rods at the discharge end of the conveyor with their top edges at an elevation relative to the top run of the conveyor to receive successive rows of eggs as the roller assemblies are advanced about the end of the conveyor, an egg orienting device mounted for vertical reciprocation in the space between said cross rods, vertically disposed pins on said orienting device arranged so as to guide the eggs as received from the conveyor into vertically disposed relation in a closely grouped row, and a transfer device having a row of co-operating gripper members thereon and a frame which is mounted for swinging movement between an egg deposit position above the tray support, means for reciprocating the egg orienting device in timed relation to the advance of the transporting conveyor, means to swing the transfer frame between the egg pick up and egg deposit positions in timed relation to the movement of the egg orienting device, and means to open and close the gripper members when they are in the deposit and pick up positions.

10. Apparatus for transferring eggs in row formation from an endless traveling egg conveyor in a direction laterally of the conveyor to the pockets of a packing tray supported along the side of the conveyor, said egg conveyor comprising parallel roller assemblies extending between side support members and having circumferential grooves forming egg receiving pockets between adjacent roller assemblies in which the eggs are supported in end-to-end relation, a pair of parallel spaced cross bars at the discharge end of the conveyor with their top edges below the top run of the conveyor so as to receive successive rows of eggs thereon from the roller assemblies, an egg lifting device mounted for reciprocation in the space between said cross rods having spaced, vertically disposed pins thereon arranged so as to guide the eggs into vertically disposed relation, and a transfer device having co-operating gripper members mounted thereon for swinging movement between an egg pick up position above said egg lifting device and an egg deposit position above the tray support, means for reciprocating the egg lifting device in timed relation to the advance of the egg conveyor, means to swing the transfer device between the egg pick up and egg deposit positions in timed relation to the movement of the egg lifting device and means to open and close the gripper members.

11. The combination with a horizontally disposed, endless egg carrying conveyor which is characterized by spaced rollers extending between side chains and having axially spaced aligned grooves adapted to form egg receiving pockets between successive rollers, an egg tray supporting conveyor also disposed horizontally and arranged to travel parallel with and along one side of said egg carrying conveyor, an egg transfer frame, said transfer frame being pivotally mounted to swing in a lateral path between and above said conveyors, a laterally disposed gripper frame pivoted on said transfer frame so as to swing about an axis which is parallel with the pivot axis of the transfer frame, a plurality of pairs of co-operating egg gripper members on said gripper frame, means to oscillate said transfer frame between a position above an egg tray carried on said tray supporting conveyor and a position above said egg carrying conveyor, means to maintain said gripper frame in a horizontal position, means to close said pairs of grippers on a row of eggs when said gripper frame is in the one position, and means to open said pairs of grippers when said gripper frame is in the other position.

12. The combination with a horizontally disposed intermittently advancing endless egg carrying conveyor which is characterized by spaced rollers extending between side chains and having axially spaced grooves which are aligned longitudinally of the conveyor so as to form egg receiving pockets between successive rollers, an intermittently operated tray supporting conveyor also disposed horizontally along one side of said carrying conveyor and arranged to travel in a path parallel therewith and in the opposite direction, an egg transfer device mounted adjacent the egg receiving end of the egg carrying conveyor, said transfer device comprising a rectangular frame at one end on an upright support so as to swing in a lateral path between and above said conveyors on an axis parallel with said conveyors, a laterally disposed gripper assembly pivoted on the free end of said frame so as to swing about an axis which is parallel with the pivot axis of said frame, a plurality of pairs of co-operating egg gripper members pivoted on said gripper assembly, means to swing said frame between a position above an egg tray on said tray supporting conveyor and a position above said egg carrying conveyor, means to hold said gripper assembly in a horizontal position while it is moving with said frame, means to close said pairs of grippers on a row of eggs when said gripper assembly is in one of said positions and to open said pairs of grippers so as to release the eggs when said gripper frame is in the other of said positions.

13. Apparatus for transferring eggs in row formation between an endless traveling egg conveyor and the pockets of a packing tray supported along the side of the conveyor, said egg conveyor comprising parallel roller assemblies extending between side support members and having circumferential grooves forming egg receiving pockets between adjacent roller assemblies in which the eggs are supported in end-to-end relation, means associated with the conveyor for changing the position of the eggs upon transfer to and from said conveyor, said transfer apparatus having co-operating egg gripper members mounted thereon for swinging movement between an egg pick up position and an egg deposit position above the conveyor and the tray support, means for reciprocating the transfer apparatus in a lateral path and in timed relation to the advance of the egg conveyor between the egg pick up and egg deposit positions and means to open and close the gripper members at the egg deposit position and the egg pick up position, respectively.

References Cited by the Examiner

UNITED STATES PATENTS

| | | | |
|---|---|---|---|
| 1,852,309 | 4/1932 | Kennedy | 88—14.2 |
| 2,371,128 | 3/1945 | Costa | 214—1 X |
| 2,895,587 | 8/1959 | Willsey | 198—27 |

GERALD M. FORLENZA, *Primary Examiner.*